(No Model.) 2 Sheets—Sheet 2.
W. F. C. M. McCARTY.
APPARATUS FOR DISTILLING.

No. 283,003. Patented Aug. 14, 1883.

UNITED STATES PATENT OFFICE.

WILLIAM F. C. M. McCARTY, OF BERLIN, GERMANY.

APPARATUS FOR DISTILLING.

SPECIFICATION forming part of Letters Patent No. 283,003, dated August 14, 1883.

Application filed May 22, 1883. (No model.)

*To all whom it may concern:*

Be it known that I, WILLIAM FITZ-CHARLES MASON McCARTY, a citizen of the United States of North America, residing at the city of Berlin, in the German Empire, have invented certain new and useful Improvements in Apparatus for Distilling, of which the following is a specification.

My invention relates to improvements in apparatus for distilling; and it consists in the special construction and arrangement of the parts of the said distilling apparatus, so as to obtain (a) a rapid circulation of the fluid or liquid or other matter under treatment through suitable pipes or tubes, so that the said fluid or liquid is discharged in more or less finely divided or spray form onto a suitable sieve or perforated diaphragm, whereby the said fluid or liquid is still further subdivided while being acted on by superheated steam and under the employment of continuous vacuum; (b,) a thorough and perfect agitation of the said fluid or other matter under treatment while the same is being acted on by superheated steam and in the presence of a continuous vacuum, so that an extremely rapid distillation is achieved at a low temperature, and so that mineral oils, chemicals, and other matters or substances can be distilled rapidly, economically, and at a lower temperature than heretofore; (c,) a rapid distillation of alcohols and other volatile fluids or liquids at a low temperature, thus retaining all the fruity and natural flavor, while the employment of the low temperature and the continuous vacuum mentioned above enables me to produce pure alcohol or other pure distilled liquid or fluid, the fusel-oil or other matter less volatile than the product of distillation being left behind by reason of the heat employed being insufficient to volatilize the same. Chemicals and other matters requiring low temperatures can be more economically distilled by this process than by any other process known heretofore.

In order to obtain different products or products of different quality, I may also employ a system of condensers supplied with double walls or a water or condensing jacket, which said water or other cooling fluid is kept at different temperatures in the various condensers or cooling-vessels; but as this is not herein claimed, it is not illustrated.

In order that my said invention may be more fully understood, I will now proceed to describe the same, reference being made to the accompanying drawings.

Figure 1:
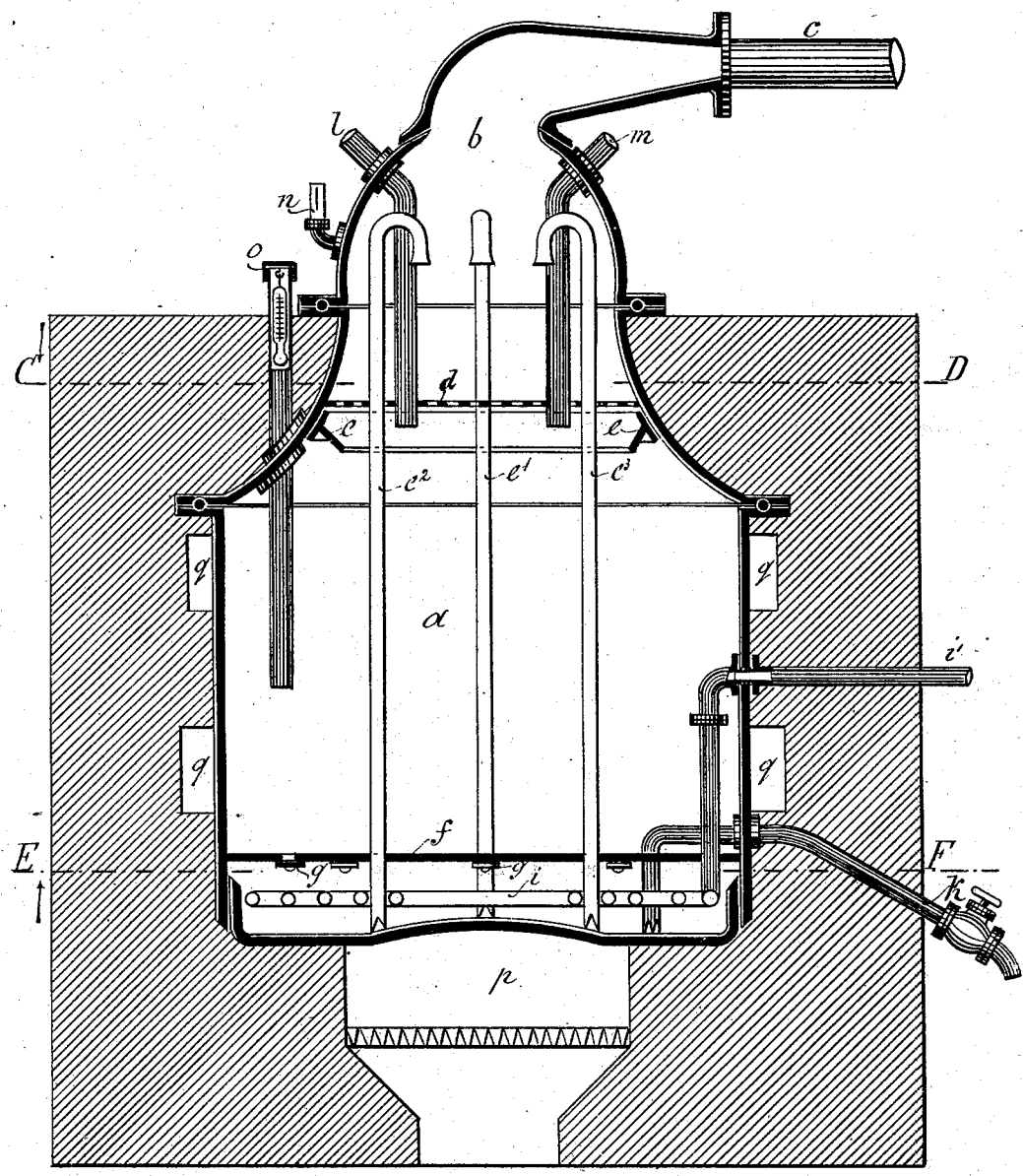
Figure 2:
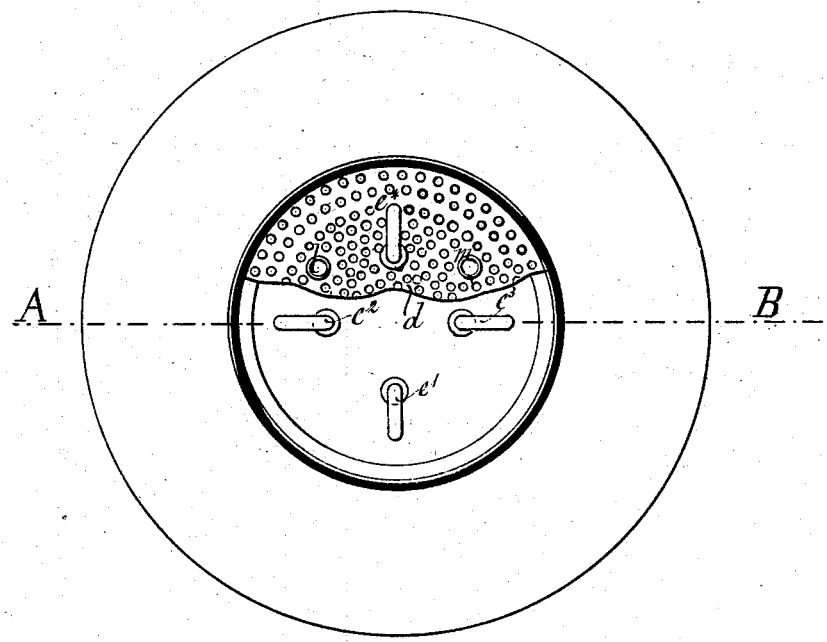
Figure 3:
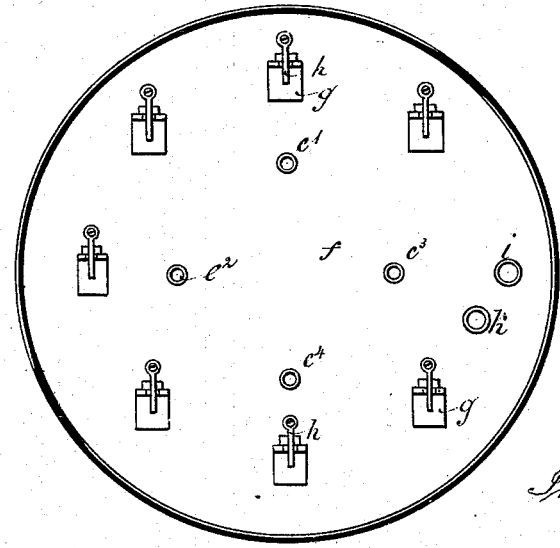

Figure 1 is a vertical section of the apparatus on the line A B in Fig. 2. Fig. 2 is a horizontal section on the line C D in Fig. 1. Fig. 3 is a horizontal section on the line E F in Fig. 1, seen from below.

$a$ is the interior space of the distilling apparatus, above which the dome $b$ is screwed, riveted, or otherwise attached, in which said dome a continuous vacuum is maintained.

The tube or pipe $c$ is connected to the dome $b$ by means of a suitable flange, which said pipe or tube is in connection with the vacuum chamber or cylinder.

$d$ is a sieve or perforated diaphragm in the upper part of the apparatus onto which the particles from the circulating tubes or pipes fall, so as to create a still greater subdivision of the atoms or particles, which said sieve rests on the upper projecting part of the flange to the ring $e$. The said ring $e$ is so arranged that the inner edge is located lower than the outer edge or periphery, so as to prevent the fluids treated from boiling or cooking over.

$e'$ $e^2$ $e^3$ $e^4$ are circulating pipes or tubes which reach below the false bottom at the lower part of the apparatus and almost into the dome, at which said upper end the said tubes or pipes are bent over and provided with a suitable rose, so as to spread the liquid or fluid as much as possible.

$f$ is a false bottom provided with suitable openings, which said openings are provided with suitable valves, $g$, for closing the openings in the said false bottom, and thus compel the liquid or fluid between the false bottom and the bottom of the boiler to circulate in the pipes or tubes $e'$ $e^2$ $e^3$ $e^4$. These said valves are held in correct position by means of suitable springs, $h$. The steam-coil $i$ is arranged between the bottom and the false bottom $f$. The steam-supply pipe $i'$ for the coil is located considerably higher up, as shown in the accompanying drawings. The tube or pipe $k$, for drawing off the liquid, passes through the false bottom $f$ and reaches to the bottom of the apparatus, so as to draw off the entire contents of the apparatus.

$l$ is a tube or pipe for feeding the apparatus with material; m, a like tube for withdrawing the material from the upper part of the apparatus when desired.

n is a permanent thermometer; o, a thermometer tube or pipe, in which a thermometer can be inserted for testing the heat in the fluid itself.

p is the furnace for heating the apparatus by direct fire.

q are the fire-canals.

It is evident that the arrangement of the parts can be modified in various manners without departing from the tenor of my said invention.

Having now described my said invention and the manner in which the same is to or may be carried into effect, I wish it to be understood that what I claim, and desire to secure by Letters Patent, is—

1. A distilling-vessel provided with a dome in which a continuous vacuum is maintained, a perforated diaphragm or sieve below said dome, and pipes leading from the bottom of the still and discharging through roses above the diaphragm, substantially as shown and described.

2. A distilling-vessel provided with a dome in which a continuous vacuum is maintained, a perforated diaphragm or sieve below said dome, pipes leading from the bottom of the still and discharging through roses above the diaphragm, and a steam-coil within said vessel, substantially as shown and described.

3. The combination, substantially as shown and described, of the chamber $a$, having the dome $b$, in which a vacuum is constantly maintained, a sieve, $d$, pipes $e'$ $e^2$ $e^3$ $e^4$, having rose ends, the false bottom $f$, provided with valves $g$, the steam-coil, and inlets and outlets, as and for the purpose specified.

WILLIAM FITZ-CHARLES MASON McCARTY.

Witnesses:
EDWIN A. BRYDGES,
ANTHONY STEFFEN.